US008270376B2

(12) United States Patent
Dahlman et al.

(10) Patent No.: US 8,270,376 B2
(45) Date of Patent: Sep. 18, 2012

(54) METHODS FOR IMPROVING UPLINK COMMUNICATIONS IN A WIDEBAND CODE DIVISION MULTIPLE ACCESS (WCDMA) COMMUNICATION SYSTEM

(75) Inventors: Erik Dahlman, Bromma (SE); Eva Englund, Linkoping (SE); Jung-Fu Cheng, Cary, NC (US); Yi-Pin Eric Wang, Cary, NC (US); Maria Edvardsson, Jarfalla (SE); Stefan Parkvall, Stockholm (SE); Janne Peisa, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1295 days.

(21) Appl. No.: 11/575,121

(22) PCT Filed: Sep. 7, 2005

(86) PCT No.: PCT/SE2005/001309
§ 371 (c)(1),
(2), (4) Date: Mar. 12, 2007

(87) PCT Pub. No.: WO2006/031177
PCT Pub. Date: Mar. 23, 2006

(65) Prior Publication Data
US 2007/0242652 A1    Oct. 18, 2007

(30) Foreign Application Priority Data
Sep. 15, 2004 (SE) ...................... 0402260

(51) Int. Cl.
*H04B 7/216* (2006.01)
(52) U.S. Cl. ........ 370/335; 370/352; 370/401; 370/412; 370/329; 370/338; 370/342; 370/343; 370/345; 370/346; 370/348; 455/523; 455/522; 455/466; 455/68; 375/240.27

(58) Field of Classification Search .......... 370/338, 370/342, 352, 328, 401, 465, 412, 395, 320, 370/471, 209, 433, 441, 470, 749, 472; 455/437, 455/522, 466, 68
See application file for complete search history.

(56) References Cited

U.S. PATENT DOCUMENTS

| | | | |
|---|---|---|---|
| 2003/0112786 A1* | 6/2003 | Terry et al. | 370/342 |
| 2003/0157953 A1* | 8/2003 | Das et al. | 455/522 |
| 2003/0232622 A1* | 12/2003 | Seo et al. | 455/437 |
| 2004/0233899 A1* | 11/2004 | Vayanos et al. | 370/352 |
| 2005/0047416 A1* | 3/2005 | Heo et al. | 370/395.4 |
| 2005/0250497 A1* | 11/2005 | Ghosh et al. | 455/436 |
| 2006/0268880 A1* | 11/2006 | Zhao et al. | 370/394 |

* cited by examiner

*Primary Examiner* — Patrick Edouard
*Assistant Examiner* — Fred Casca
(74) *Attorney, Agent, or Firm* — Roger S. Burleigh

(57) ABSTRACT

Methods for improving uplink communications in a Wideband Code Division Multiple Access (WCDMA) communication system, wherein mobile terminals can transmit at various transmission power levels. In a mobile terminal, the method includes the steps of receiving a configuration message having at least one of a power offset parameter and a maximum number of retransmission attempts parameter; when the mobile terminal performs a non-scheduled transmission, it transmits according to the parameters contained in the configuration message. In a network node, the method includes the steps of transmitting to at least one mobile terminal the configuration message having at least one of a power offset parameter and a maximum number of retransmission attempts parameter; and, adjusting a power setting for the transmission of acknowledgement or negative-acknowledgement messages from the wireless network to one or more of mobile terminals.

10 Claims, 4 Drawing Sheets

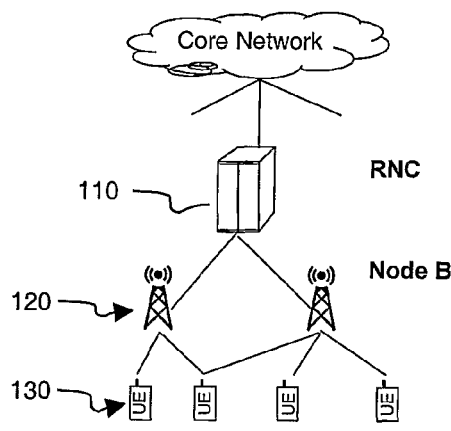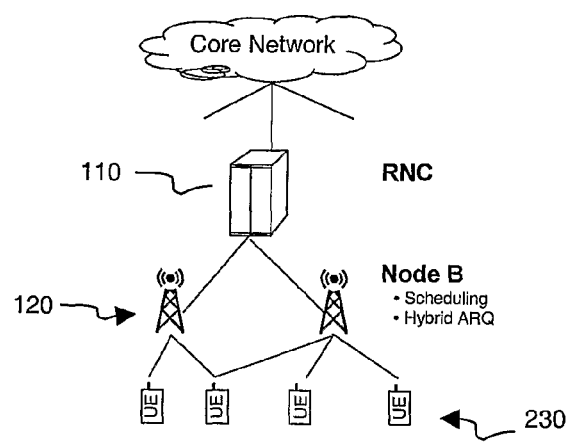
Fig. 1a
Fig. 1b

| Minimum set | Scheduled Transmissions | | | | | Non-scheduled Transmissions | |
|---|---|---|---|---|---|---|---|
| | Normal | | Boost | | | | |
| TF | TB size | $\beta_{E\text{-}DPDCH}$ | # HARQ attemp | $\beta_{E\text{-}DPDCH}$ | # HARQ attemp | $\beta_{E\text{-}DPDCH}$ | Max # HARQ attempts |
| 1 | 320 | $\Delta/4$ | $4 \times N$ | $\Delta'/4$ | $4 \times N'$ | $\Delta''/4$ | $4 \times N''$ |
| 2 | 320 | $\Delta/2$ | $2 \times N$ | $\Delta'/2$ | $2 \times N'$ | $\Delta''/2$ | $2 \times N''$ |
| 3 | 320 | $\Delta$ | $N$ | $\Delta'$ | $N'$ | $\Delta''$ | $N''$ |
| 4 | $2 \times 320$ | $2 \times \Delta$ | $N$ | $2 \times \Delta'$ | $N'$ | | |
| 5 | $3 \times 320$ | $3 \times \Delta$ | $N$ | $3 \times \Delta'$ | $N'$ | | |
| 6 | $4 \times 320$ | $4 \times \Delta$ | $N$ | $4 \times \Delta'$ | $N'$ | | |
| ... | ... | ... | ... | ... | ... | | |

Fig. 2

METHODS FOR IMPROVING UPLINK COMMUNICATIONS IN A WIDEBAND CODE DIVISION MULTIPLE ACCESS (WCDMA) COMMUNICATION SYSTEM

FIELD OF THE INVENTION

The present invention is directed, in general, to wireless communications and, more specifically, to methods for improving uplink communications in a $3^{rd}$ generation wireless communication system, e.g. a Wideband Code Division Multiple Access (WCDMA) or a Orthogonal Frequency Division Multiplexing (OFDM) communication system.

BACKGROUND OF THE INVENTION

The $3^{rd}$ Generation Partnership Project (3GPP) has standardized Enhanced uplink for WCDMA. Among the features introduced are fast scheduling and fast Hybrid Automatic Repeat Request (HARQ) with soft combining, both located in the Node B. An illustration of the overall architecture is illustrated in FIG. 1-A, with the new features introduced by the enhanced uplink in FIG. 1-B.

Hybrid ARQ with soft combining allows a radio base station (120), i.e. the Node B in a WCDMA-system, to rapidly request retransmissions of erroneously received data entities, leading to significantly reduced delays compared to earlier releases of the WCDMA specification according to which the Radio Network Controller (RNC) 110 is responsible for all retransmissions within the radio access network. Soft combining with hybrid ARQ can also be used to enhance the capacity of the system by deliberately targeting multiple transmission attempts for each data entity, and by using the soft combining mechanism in the receiver to accumulate the received energy until the data is successfully decoded. This can be viewed as implicit link adaptation and was not provided for in earlier releases of the WCDMA specification due to the lack of a soft combining mechanism. Typically, a small number of transmission attempts (i.e., a low Block Error Rate (BLER) for the initial transmission), reduces transmission delays at the cost of a decreased system capacity. Similarly, by targeting a larger number of transmission attempts (i.e., a high BLER for the initial transmission attempt), the system capacity is increased at the cost of increased delays. The choice of hybrid ARQ operating points (in terms of the targeted number of transmission attempts) thus depends on the system load and the delay requirements for a particular service.

For each transmission attempt in the uplink, a positive or negative acknowledgement is sent in the downlink. If there are several users in difficult radio conditions (e.g. at the edge of the cell), a simultaneous transmission of acknowledgements to these users can consume a significant amount of the total Node B power.

Uplink transmissions on the Enhanced Dedicated Channel (E-DCH) can use any of the transport formats defined for the E-DCH. With each transport format, there is an associated power value, typically specified relative to the Dedicated Physical Control Channel (DPCCH), and a payload size. Fast scheduling denotes the possibility for the Node-B to control when user equipment (e.g., a Mobile Terminal) is transmitting and at what data rate. This influences the selection of the transport format that the user equipment should use. Data rate and transmission power are closely related, and scheduling can thus also be seen as a mechanism to vary the transmission power used by the user equipment for enhanced uplink traffic on the Enhanced Dedicated Physical Data Channel (E-DP-DCH). As the power availability in the user equipment at the time of transmission is not known to the Node-B, the final selection of data rate has to be performed by the user equipment itself. The Node-B only sets an upper limit on the transmission power the user equipment may use on the E-DP-DCH. If a user equipment identifies that it does not have sufficient power available to fully utilize the upper limit given by the Node-B, it will limit the data rate. At extreme cases, the user equipment may determine that it does not have sufficient power to transmit even a single Protocol Data Unit (PDU).

To ensure that important information, such as radio resource control signalling, can always be transmitted, a minimum set is defined. The minimum set can always be transmitted, even if Node B has not scheduled the user equipment. Also, if the power available would not be sufficient to guarantee a required error probability, the minimum set can be transmitted and the retransmission protocol (HARQ or Radio Link Control (RLC)) would ensure that the packet is eventually delivered. Typically, the minimum set would consist of transport format(s) carrying only a single PDU.

In 3GPP2, similar enhancements have recently been introduced for cdma2000. The concept of minimum set for Release 99 (R99) is defined in 3GPP TS25.331, incorporated herein by reference.

SUMMARY OF THE INVENTION

To address the above-discussed deficiencies of the prior art, the present invention provides methods for improving uplink communications in a $3^{rd}$ generation wireless communication system, e.g. a Wideband Code Division Multiple Access (WCDMA) or a Orthogonal Frequency Division Multiplexing (OFDM) communication system, wherein mobile terminals can transmit at various transmission power levels. In a mobile terminal, the method includes the steps of receiving a configuration message having at least one of a power offset parameter and a maximum number of retransmission attempts parameter; when the mobile terminal performs a non-scheduled transmission, it transmits according to the parameters contained in the configuration message.

In one embodiment, the transmission power level for non-scheduled transmissions is a function of the power offset parameter. In related embodiments, the non-scheduled transmission is retransmitted as a function of the maximum number of retransmission attempts parameter. The non-scheduled transmission can be, for example, a Hybrid Automatic Repeat Request (HARQ).

The method can further include the step of the mobile terminal receiving one or more HARQ status reports during the non-scheduled transmission. The non-scheduled transmission can be retransmitted as a function of the maximum number of retransmission attempts parameter and information contained in the one or more HARQ status reports.

The configuration message can include at least one of the power offset parameter and the maximum number of retransmission attempts parameter for a minimum set of transport formats. The configuration message can also include at least one of the power offset parameter and the maximum number of retransmission attempts parameter for use in transmitting high priority data in a boost configuration; it can further include boost configuration parameters for a plurality of transport formats.

In a network node, the method includes the steps of transmitting to at least one mobile terminal the configuration message having at least one of a power offset parameter and a maximum number of retransmission attempts parameter; and, adjusting a power setting for the transmission of acknowledgement or negative-acknowledgement messages from the wireless network to one or more of mobile terminals. In one embodiment, the configuration message comprises at least one of the power offset parameter and the maximum number of retransmission attempts parameter for a minimum set of transport formats. The configuration message can further include at least one of the power offset parameter and the maximum number of retransmission attempts parameter for use in transmitting high priority data in a boost configuration; it can further include boost configuration parameters for a plurality of transport formats.

The step of adjusting a power setting for the transmission of acknowledgement or negative-acknowledgement messages from: the wireless network to one or more of the mobile terminals can include the step of prioritizing the transmission of the messages to the one or more mobile terminals. In such embodiments, the step of prioritizing can be dropping the transmission of the acknowledgement or negative-acknowledgement messages as a function of the required transmission power. Dropping the transmission of the acknowledgement or negative-acknowledgement messages can also be performed as a function of the service class of each mobile terminal to which the messages are to be transmitted, as a function of the data rate currently in use by each mobile terminal to which the messages are to be transmitted, or as a function of the data priority for each mobile terminal to which the messages are to be transmitted. The step of prioritizing can also include transmitting the acknowledgement or negative-acknowledgement messages only within a radio sector which currently experiences the best radio conditions.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form. The following detailed description describes the present invention by help of a WCDMA-based communication system; however, it should be understood that its principles can be readily adapted to other types of 3$^{rd}$ generation systems, e.g. OFDM-based communication systems.

BRIEF DESCRIPTION OF THE DRAWINGS

For a more complete understanding of the invention, reference is now made to the following detailed description taken in conjunction with the accompanying drawings, in which:

FIG. 1-A illustrates a prior art wireless network architecture;

FIG. 1-B illustrates a wireless network architecture with the enhancements according to the principles of the present invention;

FIG. 2 illustrates an example of transport formats, transmit power and number of HARQ attempts for 'normal', 'boost' and 'autonomous transmission for minimum set' mode according to the principles of the present invention;

DETAILED DESCRIPTION OF THE INVENTION

Figure 3:
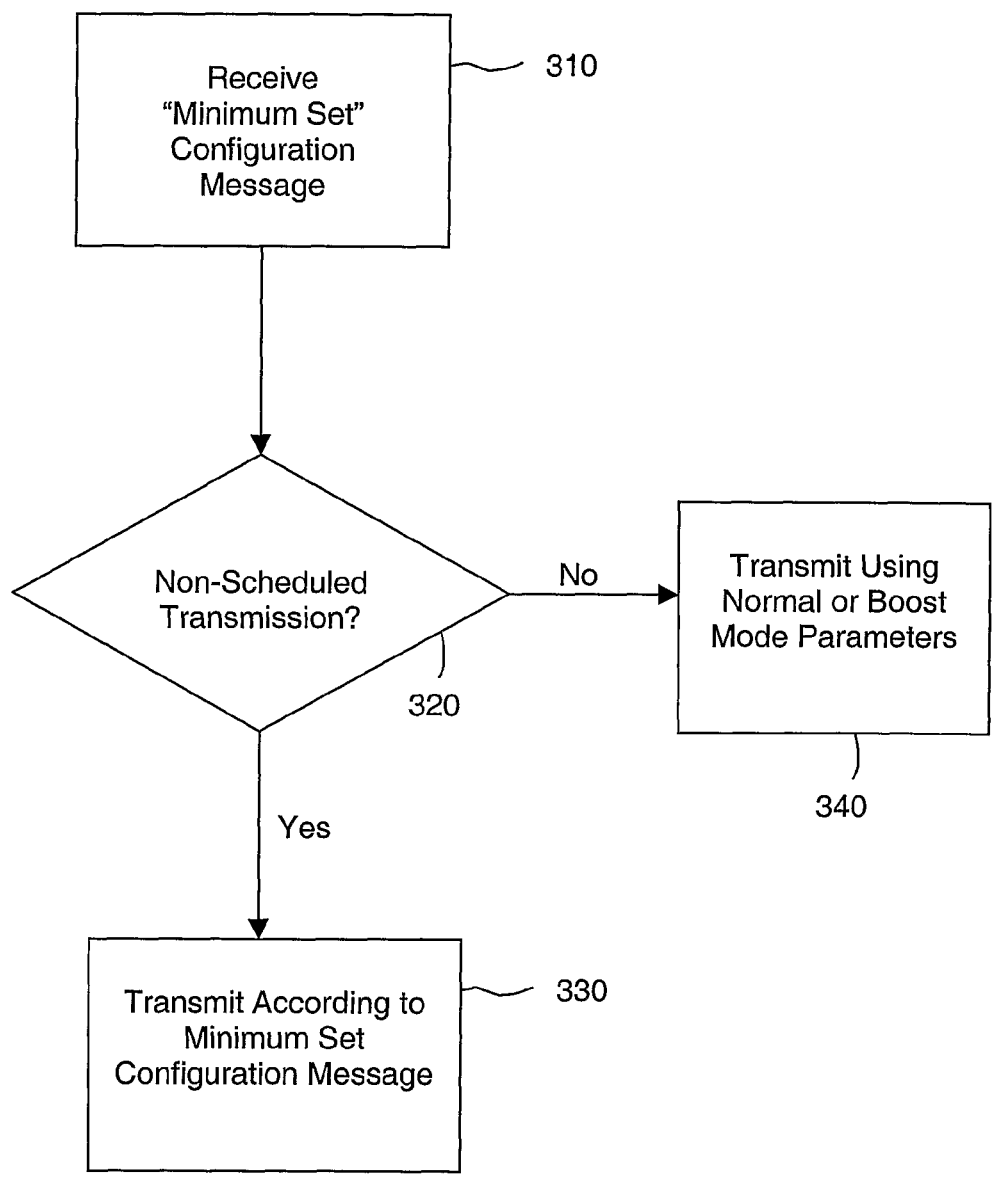
FIG. 3 illustrates an exemplary flow chart of a method in a mobile terminal for improving uplink communications in a Wideband Code Division Multiple Access (WCDMA) communication system according to the principles of the present invention; and, FIG. 4 illustrates an exemplary flow chart of a method in a wireless network for improving uplink communications in a Wideband Code Division Multiple Access (WCDMA) communication system according to the principles of the present invention.

As stated above, the scheduler in the prior art radio base station 120 can only limit the data rate of all user equipments to the minimum set and a User Equipment (UE) can autonomously determine to transmit using a transport format (data rate) from the minimum set. Hence, there is no possibility for the radio base station 120 to control how many of the active users transmit autonomously with the minimum set and no possibility to control the associated Acknowledgement (ACK)/Negative-Acknowledgement (NAK) signalling load in the downlink. If there are several users in difficult radio conditions (e.g. at the edge of the cell) a simultaneous transmission of acknowledgements to these users can consume a significant amount of the total radio base station 120 power. The solution according to the present invention includes two different ways of solving the power budget problem for acknowledgements, which can be used separately or in combination. The first embodiment of the invention is focused on how a user equipment (or "mobile terminal") 130 should react when transmitting autonomously from the minimum set, and the second embodiment of the invention is directed to what a radio base station 120 in the wireless network can do to minimize its transmit power for acknowledgements.

First, a solution to the problem for a mobile terminal 230 when transmitting autonomously from minimum set is for the radio base station to not send acknowledgements to mobile terminals sending autonomously from the minimum set if the power situation of the radio base station does not allow for that. Hence, when a mobile terminal is sending autonomously from the minimum set, it should consider that the radio base station may not have sufficient power to send acknowledgments. The proposed solution implies that a mobile terminal, when transmitting autonomously (non-scheduled) from the minimum set, should send with a pre-defined power and for a pre-defined number of times. Both the pre-defined power and transmission attempts are set by the network and may be different from the values used for normal transmission.

FIG. 2 illustrates an example of transport formats, transmit power and number of HARQ attempts for 'normal', 'boost' and 'autonomous transmission for minimum set' mode according to the principles of the present invention. As can be seen, the transmit power that should be used as well as the number of transmission attempts is different for 'normal' mode and 'non-scheduled transmission for minimum set' mode. It can also be seen that in the columns for 'boost' mode, which is intended for high priority data, the power and number of transmission attempts differs from 'normal' mode. The principle is that high priority data needs to be correctly detected much earlier than the data for normal mode, and hence the transmit power is increased to reduce the number of re-transmissions.

The power offset parameter and maximum number of retransmission attempts parameters can be set with higher layer signalling. However, even though the mobile terminal knows that a radio base station may not have power for sending acknowledgements, it should listen to the acknowledgements channel and stop its re-transmission when an ACK is received even though its pre-defined value of number of transmission attempts is not reached.

There are several ways of limiting the transmission power for sending acknowledgements. The solution described above includes the possibility for a radio base station to not send acknowledgments for autonomous transmissions for the minimum set. The following describes further possible embodiments for the radio base station to limit its transmit power for the acknowledgements.

One embodiment for saving power for the radio base station on ACK/NACK signalling is that the ACK and the NACK powers will depend on the HARQ operating point. When a low HARQ operating point is targeted (i.e., fewer re-transmissions), and hence a relatively equal number of ACKs and NACKs are expected, the best way is to send the ACK/NACK signal as BPSK or similar. On the other hand, when a high operating point is targeted (i.e., a large number of re-transmissions), the number of NACKs will be quite many related to ACKs. In this case, it may be preferred to use on-off keying for ACK/NACK signalling. The principle is that the power of the ACK and the NACK signal, in relation to each other, should depend on the HARQ operating point and can be signalled either by higher layer, on layer-one, or can be known in a pre-defined way.

According to another embodiment, a radio base station can prioritise between the acknowledgements to be sent if it runs out of power for the acknowledgments. This prioritizing can be, for example, based on: 1) power for each acknowledgement; e.g., a radio base station will first discard the acknowledgement for the mobile terminal that requires the highest power for its acknowledgment; 2) service level; e.g., a radio base station will first send acknowledgments to subscribers that belong to at least a certain premium subscription level; 3) the data rate of each mobile terminal; e.g., a radio base station sends acknowledgements first for users that have high data-rate since these require the most capacity; and, 4) the priority of the data that each mobile terminal is sending; e.g., a radio base station will first send acknowledgements to mobile terminals that have sent high priority data. Those skilled in the art will recognize that a combination of these examples can be used for making a decision for which mobile terminals an acknowledgement shall be sent. One possible combination of these examples could be a so called greedy algorithm, which assigns to each of the K users (1, 2, ..., K) a power cost of $P_k$ and a beneficial value of $V_k$. The value $V_k$ could depend on the rate and priority of the UL-data and the monthly fee paid. The value Vk can be defined, e.g., as:

$$V_k = \text{DataRate} * ((1 + \text{priority}) * (\text{nomalized monthly fee})$$

A subset of $\{1, 2, \ldots, K\}$ is chosen such that $V_k$ sum over the subset is maximized while $P_k$ sum is bounded by a number P_limit. The problem can be optimally solved using dynamic programming; such a solution, however, requires exponential complexity in K. When defining a new quantity called "value density:"

$$Dk = Vk/Pk,$$

users can be ranked by this value density. The greedy algorithm selects the users with the highest value density while keeping the $P_k$ sum under P_limit.

In an alternate embodiment, a mobile terminal in a softer handover situation and a radio base station should only send acknowledgements in the sector which at the moment experiences the best radio condition.

Figure 4:
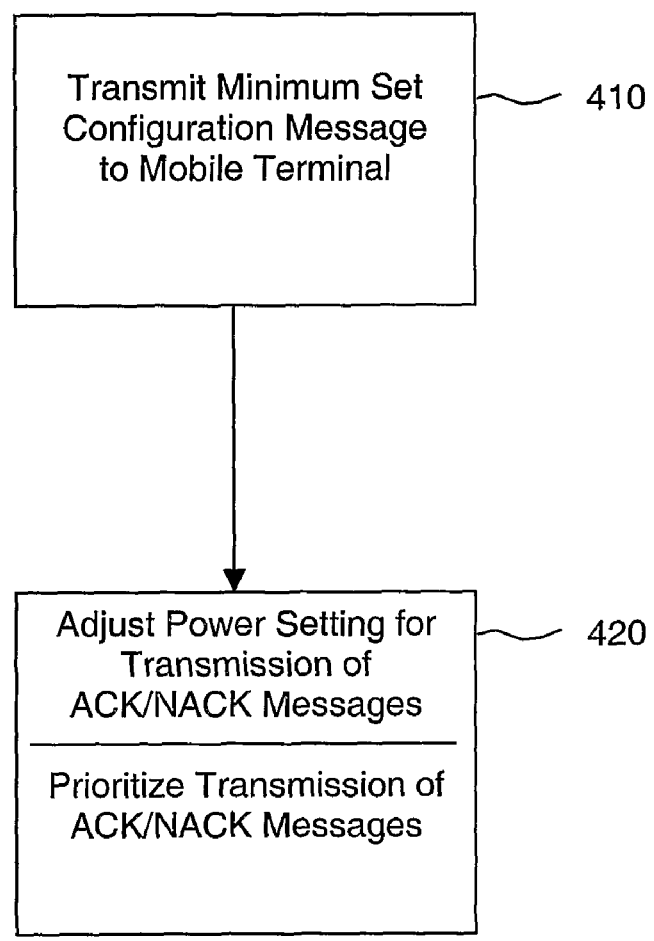

The foregoing methods are illustrated in FIGS. 3 and 4. FIG. 3 illustrates an exemplary flow chart of a method 300 in a mobile terminal for improving uplink communications in a Wideband Code Division Multiple Access (WCDMA) communication system according to the principles of the present invention. In a first step 310, a mobile terminal receives (e.g., via higher layer signalling) a configuration message consisting of power offset and maximum number of HARQ transmissions for non-scheduled transmissions ("minimum set"). It is also possible to receive other configurations (such as boost configuration for high priority data). This configuration is received prior to non-scheduled transmissions. Variations could include either receiving only power offset, only maximum number of HARQ transmissions, or receiving also other information. In a step 320, it is determined whether the transmission is a non-scheduled transmission. If it is, the transmission is performed according to the configuration message (Step 330); if it is not, the transmission is performed according to the normal or boost mode parameters. During transmission, the mobile terminal should receive HARQ status reports (NACK/ACK) regularly, and process them normally. An alternative step would be to ignore HARQ status information, and always transmit the maximum number of transmissions.

Turning now to FIG. 4, illustrated is an exemplary flow chart of a method 400 in a wireless network for improving uplink communications in a Wideband Code Division Multiple Access (WCDMA) communication system according to the principles of the present invention. Prior to mobile station transmission (e.g., at call set-up, channel reconfiguration or at some other convenient mode) the network informs the mobile station of the configuration used for non-scheduled transmissions (Step 410). This information consists of either least power offset or maximum number of HARQ transmissions, or both, for each transport format. This step can be performed by either the RNC or in a Node-B. Next, the power settings for transmission of ACK/NACK messages is adjusted (Step 420). This step can include determining whether the power needed for E-DCH HARQ feedback (ACK/NACKs) is too high. If so, the power for ACKs or NACKs is reduced. It is also possible to select zero power for either ACKs or NACKs (or both); this corresponds to using either Binary Phase Shift Keying (BPSK) or On-Off Keying (OOK). One way of reducing power is to first reduce the power of NACKs, as undetected transmission will be interpreted as NACK. It is also possible to reduce the power for all users, or just a selected set of users, by prioritizing transmission of ACK/NACK messages.

The process of prioritizing the transmission of ACK/NACK messages can be, for example, dropping the transmission of the acknowledgement or negative-acknowledgement messages as a function of the required transmission power. Dropping the transmission of the acknowledgement or negative-acknowledgement messages can also be performed as a function of the service class of each mobile terminal to which the messages are to be transmitted, as a function of the data rate currently in use by each mobile terminal to which the messages are to be transmitted, or as a function of the data priority for each mobile terminal to which the messages are to be transmitted. The step of prioritizing can also include transmitting the acknowledgement or negative-acknowledgement messages only within a radio sector which currently experiences the best radio conditions.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

The invention claimed is:

1. A method in a mobile terminal for improving uplink communications in a wireless communication system, wherein a mobile terminal can transmit at various transmission power levels, said method comprising the steps of:

receiving, by said mobile terminal, a configuration message comprising a power offset parameter and a maximum number of retransmission attempts parameter for a minimum set of transport formats; and, when said mobile terminal performs a non-scheduled transmission, perform said transmission according to the parameters in said configuration message for said minimum set of transport formats; and, when said mobile terminal performs a scheduled transmission, perform said transmission according to normal or boost configuration parameters.

2. The method recited in claim 1, wherein said transmission of said non-scheduled transmission is performed at a transmission power level that is a function of said power offset parameter.

3. The method recited in claim 1, wherein said non-scheduled transmission is retransmitted as a function of said maximum number of retransmission attempts parameter.

4. The method recited in claim 3, wherein said retransmission of said non-scheduled transmission is a Hybrid Automatic Repeat Request (HARQ).

5. The method recited in claim 4, further comprising the step of said mobile terminal receiving one or more HARQ status reports during said non-scheduled transmission.

6. The method recited in claim 5, wherein said non-scheduled transmission is retransmitted as a function of said maximum number of retransmission attempts parameter and information contained in said one or more HARQ status reports.

7. The method recited in claim 1, wherein said configuration message further comprises at least one of said power offset parameter and said maximum number of retransmission attempts parameter for use in transmitting high priority data in a boost configuration.

8. The method recited in claim 7, wherein said configuration message comprises boost configuration parameters for a plurality of transport formats.

9. The method according to claim 1, wherein the wireless communication system is a Wideband Code Division Multiple Access (WCDMA) system.

10. The method according to claim 1, wherein the wireless communication system is an Orthogonal Frequency Division Multiplexing (OFDM) system.

* * * * *

UNITED STATES PATENT AND TRADEMARK OFFICE
CERTIFICATE OF CORRECTION

PATENT NO. : 8,270,376 B2
APPLICATION NO. : 11/575121
DATED : September 18, 2012
INVENTOR(S) : Dahlman et al.

It is certified that error appears in the above-identified patent and that said Letters Patent is hereby corrected as shown below:

On the Title Page, item (75), under "Inventors", in Column 1, Line 2, delete "Linkoping" and insert -- Linköping --, therefor.

On the Title Page, item (75), under "Inventors", in Column 1, Line 5, delete "Jarfalla" and insert -- Järfälla --, therefor.

In Column 3, Line 15, delete "from:" and insert -- from --, therefor.

In Column 5, Line 45, delete "Vk" and insert -- $V_k$ --, therefor.

In Column 5, Line 46, delete "*((1" and insert -- *(1 --, therefor.

In Column 5, Line 46, delete "(nomalized" and insert -- (normalized --, therefor.

Signed and Sealed this
Fifth Day of February, 2013

Teresa Stanek Rea
*Acting Director of the United States Patent and Trademark Office*